US011356955B2

(12) United States Patent
Sui et al.

(10) Patent No.: US 11,356,955 B2
(45) Date of Patent: Jun. 7, 2022

(54) METHODS AND APPARATUS FOR REDUCING POWER CONSUMPTION IN A WIRELESS COMMUNICATIONS NETWORK

(71) Applicant: TELEFONAKTIEBOLAGET LM ERICSSON (PUBL), Stockholm (SE)

(72) Inventors: Yutao Sui, Solna (SE); Martin Van Der Zee, Malmo (SE); Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 16/635,222

(22) PCT Filed: Aug. 2, 2018

(86) PCT No.: PCT/SE2018/050783
§ 371 (c)(1),
(2) Date: Jan. 30, 2020

(87) PCT Pub. No.: WO2019/032016
PCT Pub. Date: Feb. 14, 2019

(65) Prior Publication Data
US 2021/0045060 A1    Feb. 11, 2021

Related U.S. Application Data

(60) Provisional application No. 62/542,467, filed on Aug. 8, 2017.

(51) Int. Cl.
*H04W 52/02* (2009.01)
*H04W 72/04* (2009.01)
(52) U.S. Cl.
CPC ... *H04W 52/0258* (2013.01); *H04W 72/0406* (2013.01)

(58) Field of Classification Search
CPC ......... H04W 52/0216; H04W 52/0219; H04W 52/0235; H04W 52/0258; H04W 72/0406; H04W 76/28; Y02D 30/70
(Continued)

(56) References Cited

U.S. PATENT DOCUMENTS

2012/0275364 A1    11/2012  Anderson et al.
2018/0279274 A1*    9/2018  Sun .................. H04L 1/1864
(Continued)

OTHER PUBLICATIONS

International Search Report issued for International PCT Application PCT/SE2018/050783—dated Nov. 15, 2018.
3GPP TSG RAN WG1 Meeting #88bis; Spokane, USA; Source: SONY Title: NB-Iot UE Power Consumption Reduction in Idle Mode Paging (R1-1705203)—Apr. 3-7, 2017, pp. 1-4.
(Continued)

*Primary Examiner* — Robert J Lopata
(74) *Attorney, Agent, or Firm* — Ericsson Inc.

(57) ABSTRACT

There is provided a method in a wireless terminal device for a wireless communications network. The wireless terminal device is operable in a mode in which the wireless terminal device is configurable to wake at defined instances to monitor a control channel for control messages from the wireless communications network. The control messages indicate radio resources for a shared channel over which one or more further messages are to be transmitted. The method comprises, while operating in the mode, monitoring for receipt of an indication from a network node operable in the wireless communications network in a time window associated with a particular defined instance. The indication indicates that data is available at the wireless communications network for transmission to the wireless terminal device. The method further comprises, responsive to receipt of the indication, and based on a configuration received from the network node, determining whether to monitor the control channel during the particular defined instance for a control message indicating radio resources for the shared (Continued)

channel, or to monitor the shared channel for one or more further messages using pre-configured radio resources.

20 Claims, 6 Drawing Sheets

(58) Field of Classification Search
USPC .......................................................... 370/311
See application file for complete search history.

(56) References Cited

U.S. PATENT DOCUMENTS

2018/0332549 A1* 11/2018 Bhattad ............... H04W 56/001
2020/0281042 A1* 9/2020 Tie ...................... H04W 68/025

OTHER PUBLICATIONS

3GPP TSG RAN WG1 Meeting #88bis; Spokane, USA; Source: SONY Title: MTC UE Power Consumption Reduction in Idle Mode Paging (R1-1705204)—Apr. 3-7, 2017, pp. 1-4.
3GPP TSG RAN WG1 Meeting #89; Hangzhou, China; Source: Huawei, HiSilicon; Title: On 'wake-up signal' for paging and connected-mode DRX (R1-1707021)—May 15-19, 2017, pp. 1-10.
3GPP TSG RAN WG1 Meeting #89; Hangzhou, P.R. China Source: Samsung; Title: Power saving for paging and connected-mode DRX for NB-IoT (R1-1707920)—May 15-19, 2017, pp. 1-6.
3GPP TSG RAN WG2 #99bis; Prague, Chech Republic; Source: Ericsson; Title: Wake-up Signal for NB-Iot & eMTC (R2-1710749)—Oct. 9-13, 2017, pp. 1-8.
Qualcomm Incorporated, "Efficient monitoring of DL control channels", 3GPP TSG RAN WG1 Meeting #89, R1-1708796, Hangzhou, China, May 15-19, 2017.

* cited by examiner

METHODS AND APPARATUS FOR REDUCING POWER CONSUMPTION IN A WIRELESS COMMUNICATIONS NETWORK

CROSS REFERENCE TO RELATED APPLICATIONS

This application is a 35 U.S.C. § 371 national phase filing of International Application No. PCT/SE2018/050783, filed Aug. 2, 2018, the content of which is incorporated herein by reference in its entirety, which claims the benefit of U.S. Provisional Application, Ser. No. 62/542,467, filed Aug. 8, 2017, entitled Methods and Apparatus in a Wireless Communications Network.

TECHNICAL FIELD

Embodiments of the present disclosure relate to methods and apparatus in a wireless communications network, and particularly to methods and apparatus for reducing power consumption in wireless communications networks.

BACKGROUND

Recently efforts have been made to specify technologies for use with Machine-to-Machine (M2M) and/or Internet of Things (IoT) related use cases. Suggested enhancements have included supporting Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

There are multiple differences between "legacy" Long-Term Evolution (LTE) and the procedures and channels defined for enhanced MTC (eMTC) and for NB-IoT. Some important differences include a new physical channels, such as the physical downlink control channels, called MPDCCH for eMTC and NPDCCH for NB-IoT, and a new physical random access channel, NPRACH, for NB-IoT.

Devices such as eMTC or NB-IoT devices may function in modes which reduce their power consumption. For example, in discontinuous reception mode (DRX), a device periodically wakes from a sleep mode to check for paging information transmitted by a network node over a control channel (e.g. physical downlink control channel (PDCCH)). The paging information may be transmitted using configured radio resources (i.e. frequencies, time slots) known as paging occasions. Paging information received at a paging occasion may comprise an indication of resources on a shared channel (e.g. physical downlink shared channel (PDSCH)) over which a paging message for the particular device is to be transmitted.

One topic of interest has been the introduction and specification of a physical signal or channel indicating whether a UE needs to decode subsequent physical channels (i.e. the PDCCH and PDSCH), at least for idle mode paging. Candidates for the signal/channel are:

Wake-up signal or DTX
Go-to-sleep signal or DTX
Wake-up signal with no DTX
Downlink control information The 'Wake-up (WU) signal' and 'Go-to-sleep (GTS) signal' solutions are based on the transmission of a short signal which would indicate to the UE whether or not it would have to continue to decode the full MPDCCH (for eMTC) or NPDCCH (for NB-IoT). The decoding time for the WU/GTS signal is considerably shorter than for the full MPDCCH or NPDCCH which gives a reduced UE power consumption and longer battery life. The WU signal (WUS) would be transmitted only when there is paging for the UE; if there is not, the WUS will not be transmitted (the meaning of DTX in the above agreement) and the UE would go back to sleep. The GTS signal would be transmitted only when there is no paging for the UE; if there is, the GTS will not be transmitted (the meaning of DTX in the above agreement) and the UE would continue to decode NPDCCH or MPDCCH.

Currently in 3GPP among companies the largest support seems to be for the 'Wake-up signal or DTX' solution. One problem with the WUS solution is the added signaling when a UE is being paged in addition to decoding NPDCCH/MPDCCH scrambled with the P-RNTI and then according to the DCI decode the paging message in NPDSCH/PDSCH. That is, the UE must receive and decode the wake-up signal (WUS) before any of the above as an extra step, which has a negative impact on UE power consumption and battery life. For UE being paged rarely, i.e. traffic is typically uplink oriented, this is not a big problem. However, the intention with eMTC and NB-IoT (at least from Rel-14 or Rel-15 for the latter) is that they should generically support all types of traffic. That is, downlink-dominated traffic such as actuators, switches, lamps etc. is expected to be an increasing part of IoT traffic. With the longer DRX cycles introduced by eDRX the probability of paging at a particular paging occasion will be much higher than what is seen today. For example, a UE configured with a long eDRX cycle (which may be several hours in length) may be paged every time it wakes up. In this case, transmission and reception of the WUS would have a negative impact on performance, both in terms of the power consumption at the UE and the available resources of the transmitting network node (noting that there is also an added effort for the eNB to transmit the WUS, which adds to the system resource overhead).

SUMMARY

Embodiments of the disclosure seek to address these and other problems.

For example, in one aspect the present disclosure provides a method in a wireless terminal device for a wireless communications network. The wireless terminal device is operable in a mode in which the wireless terminal device is configurable to wake at defined instances to monitor a control channel for control messages from the wireless communications network, the control messages indicating radio resources for a shared channel over which one or more further messages are to be transmitted. The method comprises: while operating in the mode, monitoring for receipt of an indication from a network node operable in the wireless communications network in a time window associated with a particular defined instance, the indication indicating that data is available at the wireless communications network for transmission to the wireless terminal device; and, responsive to receipt of the indication, and based on a configuration received from the network node, determining whether to monitor the control channel during the particular defined instance for a control message indicating radio resources for the shared channel, or to monitor the shared channel for one or more further messages using pre-configured radio resources.

Another aspect provides a method in a network node operable in a wireless communications network. A wireless terminal device is also operable in the wireless communications network, and is operable in a mode in which the wireless terminal device is configurable to wake at defined instances to monitor a control channel for control messages from the wireless communications network, the control messages indicating radio resources for a shared channel over which one or more further messages are to be transmitted. The method comprises: responsive to a determination that data is available at the wireless communications network for transmission to the wireless terminal device, transmitting an indication to the wireless terminal device in a time window associated with a particular defined instance, the indication indicating that data is available at the wireless communications network for transmission to the wireless terminal device. The network node further configures the wireless terminal device to perform, responsive to receipt of an indication, one of: monitoring the control channel during the particular defined instance for a control message indicating radio resources for the shared channel; and monitoring the shared channel for one or more further messages using pre-configured radio resources.

A further aspect provides a wireless terminal device for a wireless communications network, configured to perform the method recited above.

Another aspect provides a network node for a wireless communications network, the network node being configured to perform the method recited above.

A further aspect of the disclosure provides a wireless terminal device for a wireless communications network. The wireless terminal device is operable in a mode in which the wireless terminal device is configurable to wake at defined instances to monitor a control channel for control messages from the wireless communications network, the control messages indicating radio resources for a shared channel over which one or more further messages are to be transmitted. The wireless terminal device comprising processing circuitry and a non-transitory machine-readable medium storing instructions which, when executed by the processing circuitry, cause the wireless terminal device to: while operating in the mode, monitor for receipt of an indication from a network node operable in the wireless communications network in a time window associated with a particular defined instance, the indication indicating that data is available at the wireless communications network for transmission to the wireless terminal device; and, responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

According to another aspect, there is provided a network node operable in a wireless communications network. A wireless terminal device is also operable in the wireless communications network, and is operable in a mode in which the wireless terminal device is configurable to wake at defined instances to monitor a control channel for control messages from the wireless communications network, the control messages indicating radio resources for a shared channel over which one or more further messages are to be transmitted. The network node comprises processing circuitry and a non-transitory machine-readable medium storing instructions which, when executed by the processing circuitry, cause the network node to: responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device. The network node further configures the wireless terminal device to perform, responsive to receipt of an indication, one of: monitoring the control channel during the particular defined instance for a control message indicating radio resources for the shared channel; and monitoring the shared channel for one or more further messages using pre-configured radio resources.

Another aspect provides a wireless terminal device for a wireless communications network. The wireless terminal device is operable in a mode in which the wireless terminal device is configurable to wake at defined instances to monitor a control channel for control messages from the wireless communications network, the control messages indicating radio resources for a shared channel over which one or more further messages are to be transmitted. The wireless terminal device comprises: a monitoring module configured to, while operating in the mode, monitor for receipt of an indication from a network node operable in the wireless communications network in a time window associated with a particular defined instance, the indication indicating that data is available at the wireless communications network for transmission to the wireless terminal device; and a determining module configured to, responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

A further aspect provides a network node operable in a wireless communications network. A wireless terminal device is also operable in the wireless communications network, and is operable in a mode in which the wireless terminal device is configurable to wake at defined instances to monitor a control channel for control messages from the wireless communications network, the control messages indicating radio resources for a shared channel over which one or more further messages are to be transmitted. The network node comprises: a transmission module configured to, responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device. The network node further configures the wireless terminal device to perform, responsive to receipt of an indication, one of: monitoring the control channel during the particular defined instance for a control message indicating radio resources for the shared channel; and monitoring the shared channel for one or more further messages using pre-configured radio resources.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
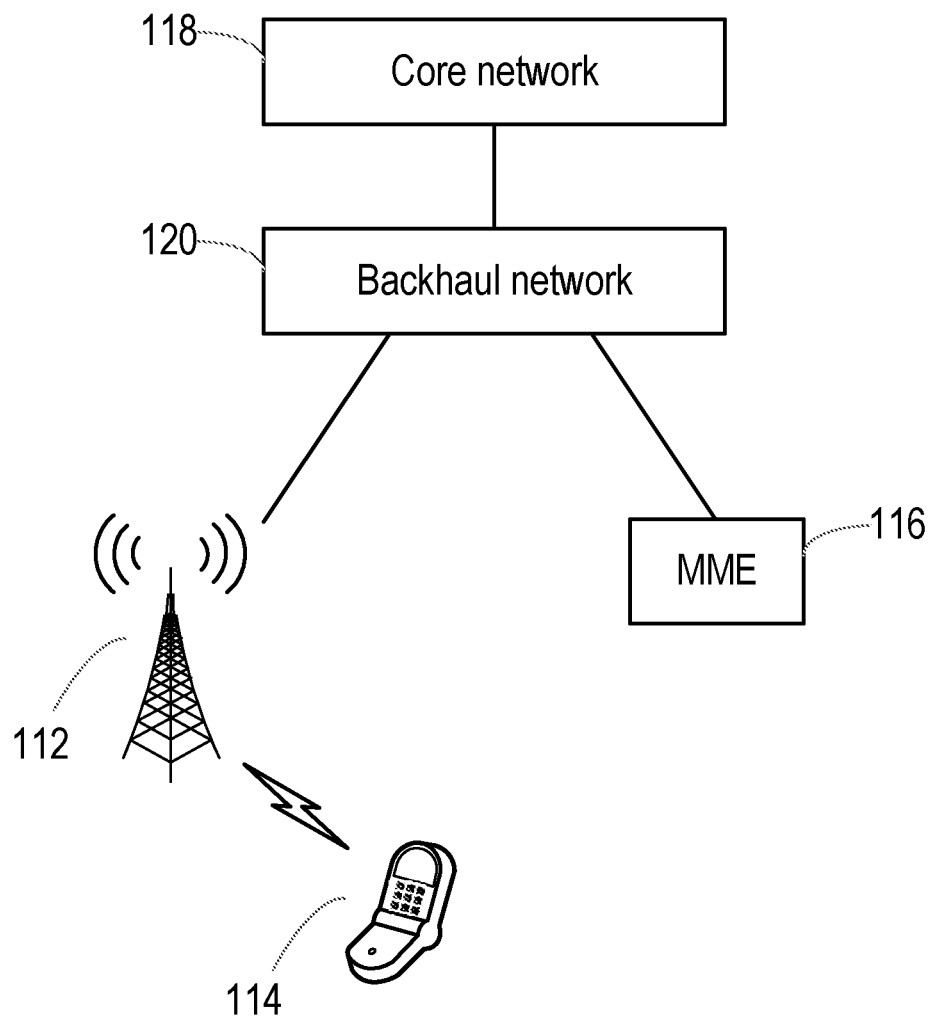
FIG. 1 shows a wireless communications network according to embodiments of the disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for machine-type communication (MTC), evolved MTC (eMTC) and narrowband Internet of Things (NB-IoT). However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology, is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term may be specified in 5G. A general description of the agreements on 5G NR Access Technology so far is contained in most recent versions of the 3GPP 38-series Technical Reports.

FIG. 1 shows a network 110 that may be utilized to explain the principles of embodiments of the present disclosure. The network 110 comprises a radio access network node 112 which is connected, via a backhaul network 120, to a core network 118. FIG. 1 also shows a wireless terminal (or UE, etc) 114 that is in wireless communication with the network node 112. A mobility management entity (MME) 116 is also provided, coupled to the network node 112 via the backhaul network 120.

The wireless terminal 114 is operable to communicate with the network 110 and particularly the network node 112. Messages transmitted by the wireless terminal 114 to the network node 112 are said to be transmitted in the "uplink" (UL), while messages transmitted by the network node 112 to the wireless terminal 114 are said to be transmitted in the "downlink" (DL).

The wireless terminal 114 may be operable in a plurality of modes, or states. One or more of those modes may be designed and specified to provide power and efficiency savings in the wireless terminal 114 and/or the network node 112. For example, the wireless terminal 114 may be operable in one or more discontinuous reception (DRX) modes, in which the wireless terminal 114 is operable to wake to monitor or listen to a control channel for signals from the network node 112. For example, the control channel may comprise a physical downlink control channel (PDCCH), or specific channels defined for the purposes of machine-type communications, such as MTC PDCCH (MPDCCH) or NB-10T PDCCH (NPDCCH). When not monitoring or listening to the control channel, the wireless terminal 114 may be in a sleep mode, in which some or all of its receive circuitry is powered down or in a low-power state. Alternatively, the wireless terminal 114 may not decode any signals received while in the sleep mode.

DRX modes may be defined differently for the wireless terminal 114 when it is operative in different states, such as different radio resource control (RRC) states. For example, in RRC_IDLE mode, the wireless terminal 114 receives paging messages from the network to indicate the presence of downlink data for transmission to the wireless terminal 114. Thus, the wireless terminal 114 wakes at defined instances, known as paging occasions (which may be periodic), to monitor or listen for paging information transmitted over the control channel. The paging information may comprise an indication of the radio resources (e.g. frequencies, time slots, etc) over which a paging message will be transmitted on a shared channel, such as the physical downlink shared channel (PDSCH), or machine-type equivalents such as MTC PDSCH (MPDSCH) and NB-IOT PDSCH (NPDSCH). The paging information may additionally or alternatively comprise an identifier such as a paging radio network temporary identifier (P-RNTI). Thus, in DRX mode for RRC_IDLE, the wireless terminal 114 wakes to listen for paging information on a control channel.

A DRX mode may also be defined for RRC_CONNECTED. In this RRC state, the wireless terminal 114 does not receive paging messages, but instead wakes at defined instances (also known as active time in this state) to monitor or listen to the control channel for an assignment of radio resources on the shared channel over which a downlink transmission is to take place (e.g. of user plane data).

In either case, the wireless terminal 114 is operable to wake at defined instances (potentially periodically) to listen to a control channel for messages indicating the need for one or more further transmissions over a shared channel (whether those further transmissions are paging messages or user plane data).

Figure 2:
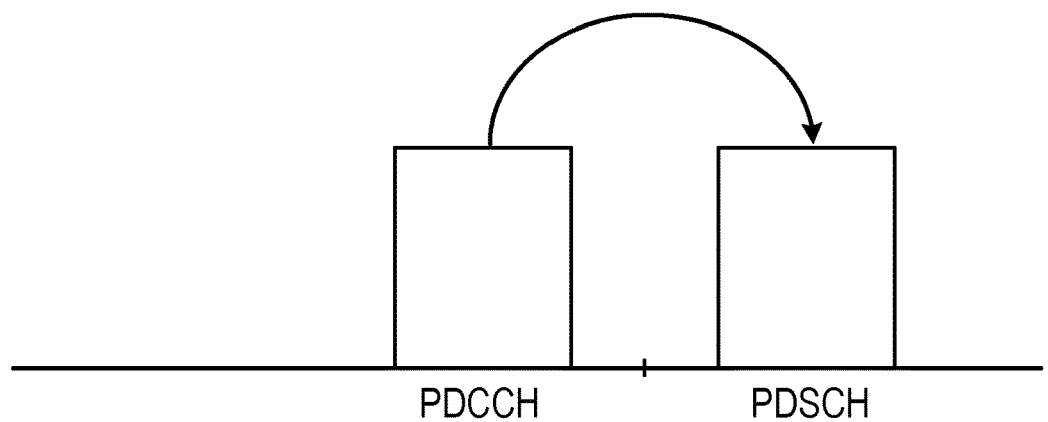
FIG. 2 shows an example of conventional paging signalling.

FIG. 2 shows an example of this signalling as defined in existing LTE standards. The wireless terminal 114 monitors a control channel (such as PDCCH) at defined instances, and determines whether it is the subject of a transmission over the control channel. Responsive to a determination that the control channel contains information for the wireless terminal, the wireless terminal proceeds to monitor and decode transmissions over a shared channel (such as PDSCH) using resources indicated in the transmission received via the control channel.

Thus existing signalling defines two stages for a wireless terminal device in a low-power state (such as a DRX mode) to receive messages via a shared channel. First, the wireless terminal device wakes from its sleep state at defined instances and monitors the control channel. This step may involve the reception and decoding of transmissions on the control channel. If the transmissions contain an indication that further transmissions are to take place for the wireless terminal device over a shared channel, the wireless terminal device must then monitor and decode the shared channel to receive the further transmissions.

One problem that has been identified with this approach is that significant power is consumed by the wireless terminal device in monitoring (i.e. receiving and decoding) the control channel at each defined instance. Thus, present developments of wireless telecommunications standards have focused on the introduction of an additional physical channel or signal in a time window which is associated with the defined instances.

For example, the additional signal may comprise a wake-up signal (WUS), the presence of which indicates that one or more messages are available for transmission to the wireless terminal device (e.g. paging messages or user plane data). Alternatively, the additional signal may comprise a go-to-sleep signal (GSS), the presence of which indicates that no messages are available for transmission to the wireless terminal device. In either case, the opposite scenario may be implicitly indicated by the absence of a signal in the time window. Thus, in the WUS implementation, the absence of a WUS may indicate that no messages are available for transmission to the wireless terminal device; in the GSS implementation, the absence of a GSS may indicate that one or more messages are available for transmission to the wireless terminal device. In still further embodiments, both WUS and GSS may be transmitted to the wireless terminal device in different scenarios (i.e. the wireless terminal device may always receive a signal, whether it is WUS or GSS to indicate the respective presence or absence of messages for transmission to the wireless terminal device).

If the absence of a signal is to be detected and implicitly understood by the wireless terminal device, the time window in which the signal is to transmitted must be configured. Such a configuration may take place via dedicated (e.g. RRC) or broadcast (e.g. system information (SI)) signalling from the network node.

For example, in some embodiments, the time window is configured immediately prior to a defined instance at which the wireless terminal device is to take to monitor the control channel. In other embodiments, the time window may overlap partially or totally with the defined instance for monitoring the control channel. In that case, transmissions over the control channel may be stored temporarily until the WUS/GSS signal is decoded. If the signal indicates that no messages are to be transmitted for the wireless terminal device, the stored data can be discarded without being decoded.

In order to provide the savings in power consumption, the WUS/GSS signal may be easier to decode than transmissions over the control channel. For example, the WUS/GSS signal may comprise a sequence of a particular length or a symbol which is repeated a certain number of times. When implemented as a repeated symbol, each symbol may comprise a single bit. The WUS/GSS signal may be transmitted as part of or during a synchronization process allowing the wireless terminal device to wake from its sleep state and synchronize with the network.

Figure 3A:
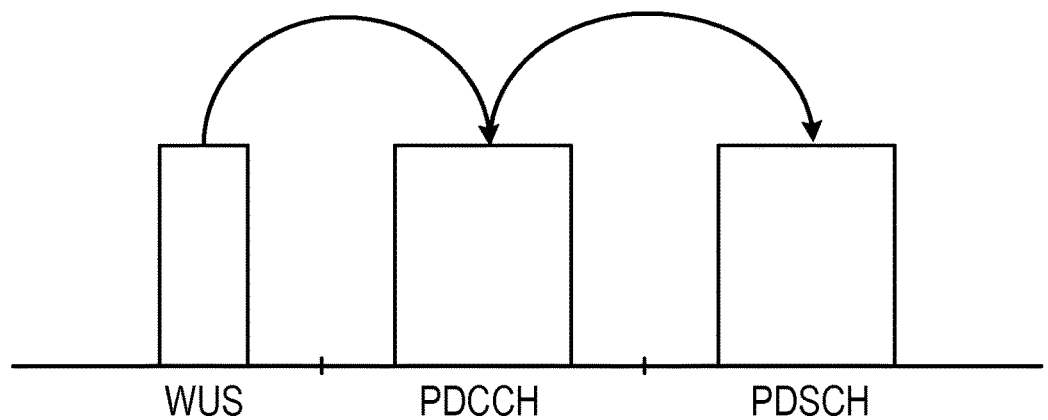
FIGS. 3*a* and 3*b* show examples of signalling according to embodiments of the disclosure.

FIG. 3a shows one possible implementation of this signalling in which a wake-up signal (WUS) is defined in a time window associated with the defined instance at which the wireless terminal device is to listen to the control channel (e.g. a paging occasion, active time, etc). In the illustrated embodiment, the time window is configured prior to the defined instance.

The wireless terminal device thus receives a wake-up signal, which indicates that data is available at the network for transmission to the wireless terminal device. The wireless terminal device then proceeds to monitor and decode a transmission over the control channel, which comprises an indication of resources on a shared channel over which one or more further transmissions are to take place to the wireless terminal device. For example, the control channel message may comprise downlink control information (DCI) indicating the resources on the shared channel which the wireless terminal device is to monitor for such further transmissions. The wireless terminal device then monitors the shared channel and receives the further transmissions (e.g. a paging message, user plane data, etc).

Figure 3B:
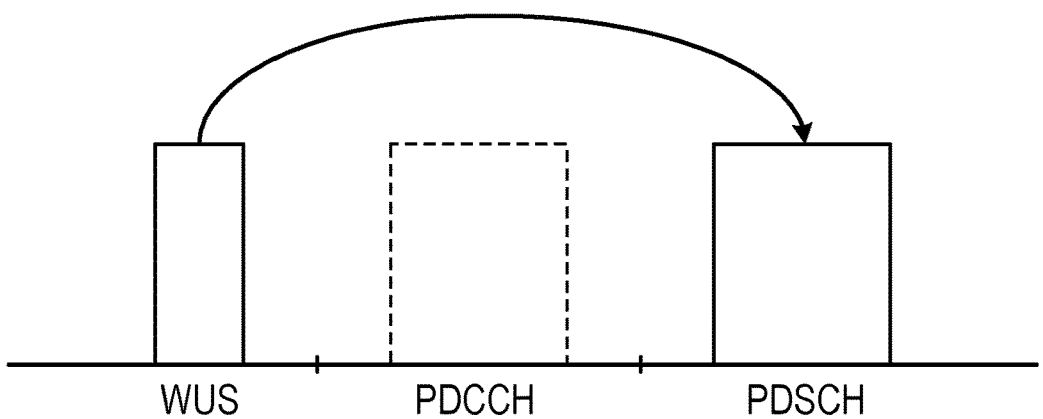

FIG. 3b shows an alternative implementation of the signalling according to embodiments of the disclosure.

In this implementation, the wireless terminal device again receives a WUS in a time window which is configured prior to the defined instance at which the wireless terminal device is to listen to the control channel. However, upon receiving a positive indication of data to be transmitted (i.e. the presence of a WUS, or the absence of a GSS), the wireless terminal device omits the step of receiving and decoding the control channel transmission and instead monitors the shared channel directly for the data to be transmitted (i.e. a paging message, user plane data, etc).

Thus power consumption at the wireless terminal device is reduced as the wireless terminal device does not decode the control channel transmission following receipt of a positive indication that data is to be transmitted over the shared channel. Power consumption at the network node, and resources for the network generally, may be saved in such an embodiment as the network node may not transmit information over the control channel.

The information ordinarily contained in the control channel transmission (e.g. in the DCI) may be pre-configured in the wireless terminal device by the network node. For example, the information may be configured in the wireless terminal device by dedicated signalling (e.g. RRC signalling) or broadcast signalling (e.g. in system information, as an extension to paging information). The information may be semi-statically or semi-persistently configured. That is, the information may be configured for a period of time, or configured until further notice, i.e. until the information is configured as different values.

For example, the control channel message may ordinarily comprise an indication of radio resources (e.g. frequency(ies), time slot(s), etc) which the wireless terminal device is to monitor for transmissions over the shared channel. As noted above, this information may be pre-configured in the wireless terminal device. The timing of the radio resources for the shared channel may be indicated relative to the timing of the WUS/GSS. For example, the timing may be indicated as a fixed offset from the timing of the WUS/GSS. The transport block size (TBS) may also be pre-configured. For example, the TBS could be selected by the network node to suit the most common size of the paging message (noting that the network node has the freedom to select the number of paging records to multiplex in the paging message to fit this fixed size—one paging message may comprise multiple paging records to page multiple wireless terminal devices).

The discussion above has focused on the use of WUS/GSS to provide an indication to the wireless terminal device that data is available for transmission to the wireless terminal device (and that the control channel should be monitored and decoded as in FIG. 3a, or the shared channel should be monitored and decoded directly, as in FIG. 3b). In alternative embodiments, a third signal may be utilized to provide the indication that data is available for transmission to the wireless terminal device. The third signal is termed herein "compact DCI" (i.e. compact downlink control information). The compact DCI may be transmitted by the network node to the wireless terminal device over the control channel, but comprises fewer bits than conventional DCI messages (i.e. those defined in Releases 13.6.0 and 14.3.0 of the 3GPP TS 36.212). For example, one or more fields of those conventional DCI messages may be omitted in the compact DCI, and pre-configured in dedicated or broadcast messages by the network node, such as an indication of the resources over which the wireless terminal device is to monitor the shared channel for further transmissions (i.e. as discussed above).

In further embodiments of the disclosure, the wireless terminal device may be configured to follow one of the signalling of FIG. 3a and the signalling of FIG. 3b. That is, the wireless terminal device may be configured to respond to the receipt of an indication that data is available for transmission to the wireless terminal device (e.g. the presence/absence of a WUS, GSS or compact DCI) in one of at least two ways: to monitor the control channel for an indication of the resources on which that data is to be transmitted; or to monitor the shared channel directly using pre-configured radio resources.

In one embodiment, the wireless terminal device may be semi-statically or semi-persistently configured as to which implementation to follow by dedicated or broadcast signalling from the network node (e.g. via RRC or SI signalling). In another embodiment, however, the configuration may be provided in the indication itself (i.e. in the WUS, GSS or compact DCI). Thus, the WUS, GSS or compact DCI may comprise an indication as to whether the wireless terminal device is to monitor and/or decode the control channel for an indication of the radio resources, or monitor and/or decode the shared channel directly using pre-configured resources (i.e. without monitoring or decoding the control channel).

For example, the WUS, GSS or compact DCI may be scrambled with one of two different identifiers (e.g. different RNTIs) to indicate which implementation should be followed. Alternatively, the WUS, GSS or compact DCI may be configured in different search spaces (or different starting system frames and/or different carriers) to indicate which implementation should be followed. For example, the control channel search space is defined as follows in Section 16.6 in TS 36.213 (version 14.3.0) for NPDCCH:

"A UE shall monitor a set of NPDCCH candidates (described in Subclause 10.2.5.1 of [TS36.211]) as configured by higher layer signalling for control information, where monitoring implies attempting to decode each of the NPDCCHs in the set according to all the monitored DCI formats.

The set of NPDCCH candidates to monitor are defined in terms of NPDCCH search spaces."

Therefore, a new search space may be defined for WUS, GSS or compact DCI, in which the wireless terminal device shall monitor the signals. For WUS or GSS, the search space may be defined as a set of candidate subframes where the wireless terminal device shall monitor the WUS or GSS signals. For compact DCI, similar concepts of the current NPDCCH search space may be used, where the wireless terminal device shall monitor a set of control channel candidates.

Figure 4:
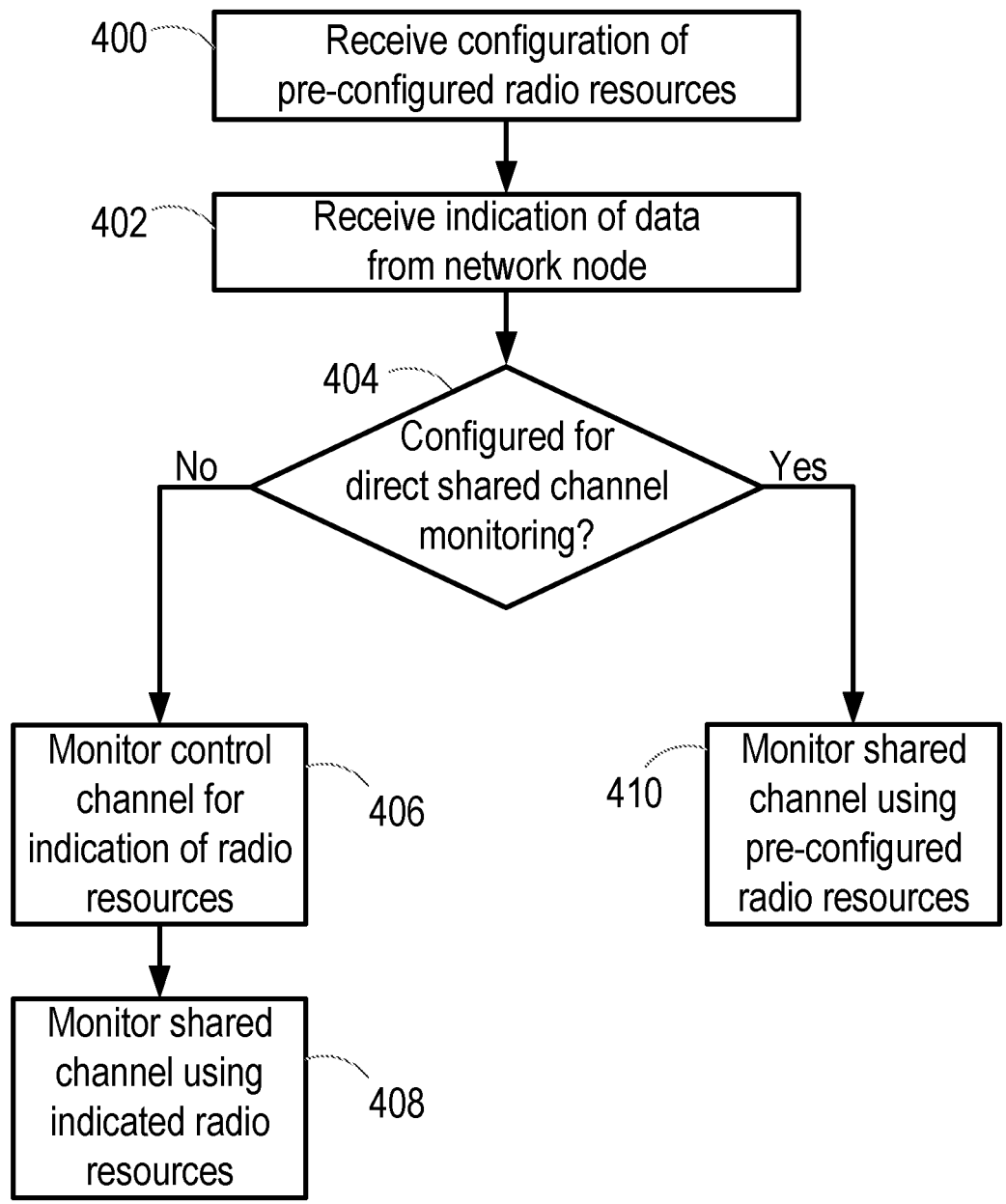
FIG. 4 is a flowchart of a method according to embodiments of the disclosure.

FIG. 4 is a flowchart of a method according to embodiments of the disclosure. The method may be carried out in a wireless terminal device, such as the wireless terminal device 114 described above, for example.

The wireless terminal device may be operable in a mode in which it wakes at defined instances to monitor a control channel (such as a PDCCH, MPDCCH, NPDCCH, etc) for an indication of resources on which to monitor for transmissions over a shared channel (such as a PDSCH, MPDSCH, NPDSCH, etc). For example, one such mode may be a DRX mode. In RRC_IDLE, the defined instances may comprise paging occasions; in RRC_CONNECTED, the defined instances may comprise active time.

In step 400, the wireless terminal device receives a configuration of pre-configured radio resources to be used by the wireless terminal device for monitoring the shared channel directly (i.e. without decoding the control channel fully) upon receipt of a positive indication that data is available for transmission to the wireless terminal device from the network. The indication may be received via dedicated or broadcast signalling from the network node (e.g. network node 112).

In step 402, while operating in the low-power mode, the wireless terminal device wakes at a defined instance or just prior to a defined instance, and monitors, in a time window associated with the predefined instance, for an indication from the network node that data is available for transmission to the wireless terminal device over a shared channel (e.g. a paging message, user plane data, etc). The indication may comprise the presence of a WUS, the absence of a GSS, or a compact DCI as defined above.

Responsive to receipt of such an indication, the method proceeds to step 404, in which the wireless terminal device determines whether it is configured to respond to such an indication by monitoring the control channel and decoding an indication of radio resources for the shared channel with which one or more messages will be transmitted to the wireless terminal device, or by monitoring the shared channel directly using the radio resources pre-configured in step 400 (i.e. without decoding the control channel). For example, the wireless terminal device may have been semi-statically or semi-persistently configured to use one of these at least two implementations in signalling from the network node (e.g. in RRC signalling or SI broadcast). In other embodiments, the indication received in step 402 may comprise such a configuration. For example, the indication may be scrambled with one of two different identifiers (e.g. different RNTIs) to indicate which implementation should be followed. Alternatively, the indication may be configured in different search spaces, starting system frames and/or different carriers (as described above) to indicate which implementation should be followed.

If the wireless terminal device is not configured for direct shared channel monitoring, the method proceeds to step 406, in which the wireless terminal device monitors, at the defined instance, the control channel for an indication of the radio resources on which one or more transmissions are to take place on the shared channel. For example, the wireless terminal device may monitor the control channel for a DCI comprising an indication of resources on which a paging message is to be transmitted. Alternatively, the wireless terminal device may monitor the control channel for a DCI comprising an indication of resources on which user plane data is to be transmitted.

In step 408, those resources are then used by the wireless terminal device to receive the transmission from the network node over the shared channel.

It will be understood by those skilled in the art that steps 406 and 408, of monitoring control and shared channels respectively, may comprise decoding data which has already been received by the wireless terminal device. For example, in some embodiments the time window in which the indication is received in step 402 overlaps with the defined instance in which the control channel is to be monitored by the wireless terminal device in step 406. Accordingly, the received signals may be stored and/or buffered, and then decoded once the positive indication has been determined in step 402, or an indication of the resources for the shared channel determined in step 406.

If, in step 404, it is determined that the wireless terminal device is configured for direct shared channel monitoring, the method proceeds to step 410 in which the wireless terminal device monitors the shared channel using pre-configured radio resources (i.e. without monitoring the control channel further).

The radio resources pre-configured in step 400 may comprise a timing offset between the timing of the indication received in step 402, and the timing of a subsequent transmission on the shared channel. Alternatively, the timing offset may define the start of a search space (i.e. a range of time slots) in which the subsequent transmission on the shared channel is to take place. Thus, in those embodiments, the wireless terminal device searches for relevant transmissions within the search space.

The radio resources pre-configured in step 400 may additionally or alternatively comprise a number of repetitions of the transmission on the shared channel. In some embodiments, the maximum number of repetitions of the transmission on the shared channel is indicated in the pre-configured resources, while the actual number of repetitions may be smaller.

The radio resources pre-configured in step 400 may additionally or alternatively comprise a transport block size (TBS) with which the messages are to be transmitted on the shared channel. For example, the network node may select a most commonly used TBS. Alternatively the network node may pre-configure a plurality of different TBS values (e.g. a subset of the possible values), such that the wireless terminal device must search the shared channel using each of the pre-configured TBS values to determine the correct TBS value. In this way, however, the effort required to search can be reduced by limiting the TBS values to the subset of all possible values.

In further embodiments, the indication received in step 402 may comprise an indication of one or more transmission parameters for the subsequent transmission on the shared channel (i.e. using the pre-configured resources). For example, the wireless terminal device may be pre-configured (e.g. in step 500) with a plurality of different TBS values; the particular chosen TBS value may then be communicated to the wireless terminal device, for example, in the indication received in step 402 (e.g. through an index value associated with one of the plurality of pre-configured TBS values). In another example, the indication received in step 402 may comprise an indication of the number of repetitions of the transmission on the shared channel. Alternatively, one or both of these parameters may be signalled in the pre-configured resources in step 400.

Two or more parameters may be combined into groups of different values, with the indication received in step 402 (or the pre-configured radio resources received in step 400) comprising an indication of a particular group of values for those two or more parameters. For example, the wireless terminal device may be configured in step 400 with a plurality of combinations of values for two or more parameters (e.g. TBS and number of repetitions). The indication received in step 402 may comprise an indication of a particular combination of values for those parameters, e.g. via transmission of an index value associated with the particular combination of values.

In some embodiments, values for one or more parameters for a subsequent transmission on the shared channel may be signalled implicitly to the wireless terminal device based on the length of the indication (i.e. the length of the WUS, GSS, compact DCI, etc) received in step 402. That is, where the indication is sequence based, the length of the sequence (e.g. the number of symbols) may be related to values for one or more parameters for a subsequent transmission on the shared channel; where the indication is symbol based, the number of repetitions of that symbol may similarly be related to values for one or more parameters for a subsequent transmission on the shared channel. For example, the value(s) for the parameter(s) may be proportional to the length of the indication, or otherwise the length of the indication may be linked to pre-defined values for the one or more parameters.

For example, the number of repetitions (or the maximum number of repetitions) of a subsequent transmission on the shared channel may be indicated by the length of the indication received in step 402. The TBS may be indicated by the length of the indication received in step 402. The length of the subsequent transmission on the shared channel may be indicated by the length of the indication transmitted in step 506.

Where the wireless terminal device is configured to follow the implementation of FIG. 3a (i.e. monitoring the control channel), the length of the indication received in step 402 may be related to the number of repetitions (or the maximum number of repetitions) of a transmission on the control channel (e.g. a DCI).

Alternatively, the length of the indication received in step 402 may be linked to the coverage of the wireless terminal device. That is, where the wireless terminal device is in relatively poor coverage, the indication may be longer to increase the likelihood that the wireless terminal device will be able to receive and decode the indication (e.g. through combining multiple repetitions).

Figure 5:
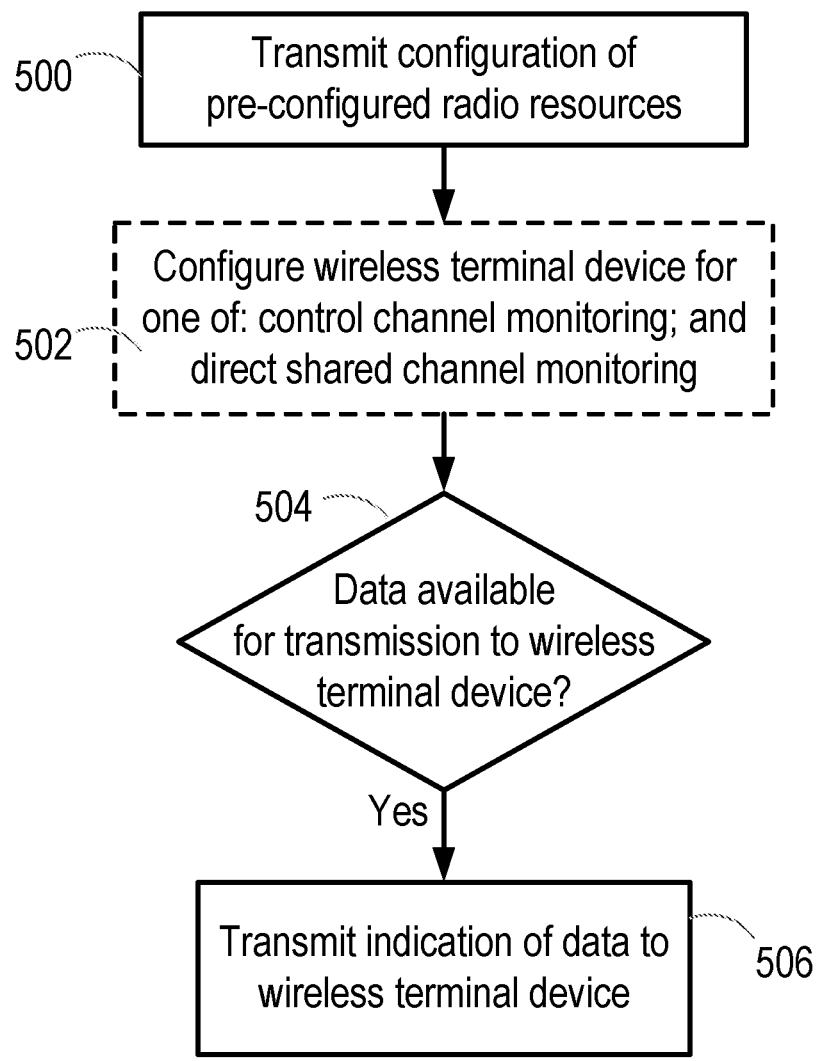
FIG. 5 is a flowchart of a method according to further embodiments of the disclosure.

FIG. 5 is a flowchart of a method according to embodiments of the disclosure. The method may be carried out in a network node operative in a wireless communications network. For example, the method may be carried out in a radio access network node, such as the network node 112, or a node which is coupled to such a radio access network node and operative to receive data corresponding to wireless signals received by the radio access network node, and to control the network node through appropriate signalling (e.g. from the cloud).

The method begins in step 500, in which the network node transmits, or initiates the transmission of, a configuration of pre-configured radio resources to a wireless terminal device operative in the wireless communications network. For example, step 500 may comprise the transmission of an indication of pre-configured radio resources via dedicated or broadcast signalling (e.g. RRC signalling or system information broadcast). The pre-configured radio resources may be utilized by the wireless terminal device when it is in a low-power mode or state, such as a DRX mode, in which the wireless terminal device wakes at defined instances to monitor a control channel for indications that data is available for transmission from the network node to the wireless terminal device. See FIGS. 3a, 3b and 4, as well as the description above, for further detail regarding this aspect.

In step 502, the network node configures the wireless terminal device to respond to receipt, while in the low-power mode or state, of a positive indication that the network has data available for transmission to the wireless terminal device (e.g., a WUS, GSS, compact DCI, etc) in one of at least two ways: monitoring the control channel at the defined instance associated with the positive indication, for an indication of resources for a shared channel over which one or more signals are to be transmitted (e.g. paging message, user plane data, etc); and monitoring the shared channel directly using the resources pre-configured in step 500 (i.e. without monitoring or decoding the control channel).

The configuration in step 502 may be signalled to the wireless terminal device via dedicated signalling (e.g. RRC) or broadcast signalling (e.g. SI). In such embodiments, therefore, the configuration may be defined semi-statically or semi-persistently.

In step 504, while the wireless terminal device is in the low-power state, the network node determines whether data is available for transmission to the wireless terminal device. For example, if the wireless terminal device is in RRC_IDLE, the network node may receive a paging indication from a network entity such as the MME 116. If the wireless terminal device is in RRC_CONNECTED, the network node may determine that user plane data is available for transmission to the wireless terminal device (e.g. data is available in one or more buffers of the network node for transmission to the wireless terminal device). If no data is available for transmission to the wireless terminal device, step 504 is evaluated repeatedly or continuously until data is available, or the method enters a holding state.

If data is available for transmission to the wireless terminal device, the method proceeds to step 506 in which the network node transmits, or initiates the transmission of, an indication to the wireless terminal device that data is available for transmission to the wireless terminal device. The indication may be transmitted in a time window associated with a defined instance at which the wireless terminal device wakes to monitor the control channel. For example, the indication may comprise a wake-up signal (i.e. the presence of a wake-up signal), a go-to-sleep signal (i.e. the absence of a go-to-sleep signal), or a compact DCI.

Depending on how the wireless terminal device is configured to respond to such an indication, the network node may go on to transmit, or initiate the transmission of, a message over the control channel comprising an indication of radio resources at which a subsequent transmission (e.g. a paging message, user plane data, etc) is to take place on the shared channel. The network node may subsequently transmit such a transmission on the shared channel using the indicated resources. If the wireless terminal device is configured to monitor the shared channel directly using the radio resources pre-configured in step 500, i.e., without monitoring the control channel, the network node transmits such a transmission using the pre-configured resources. Optionally, in such a case, the network node may omit the transmission of any further messages on the control channel at the defined instance.

Various adaptations to the illustrated embodiment will be apparent to the skilled person in light of the description and their common general knowledge. For example, the step of configuring the wireless terminal device (i.e. to follow the implementation in FIG. 3a or 3b) in step 502 is illustrated before the step of transmitting an indication to the wireless terminal device that data is available for transmission to the wireless terminal device in step 506. However, in some embodiments the indication itself contains the configuration referred to in step 502. Thus in some embodiments steps 502 and 506 may take place simultaneously.

Further, the skilled person will be aware that a network node may serve multiple wireless terminal devices, and transmissions such as paging messages may be directed to multiple wireless terminal devices. That is, each paging message may comprise one or more paging records, with each paging record provided for a particular wireless terminal device. Thus, the method shown in FIG. 5 may be applied to multiple wireless terminal devices at the same time. In step 504, if it is determined that data is available for transmission to multiple wireless terminal devices, the network node may take into account the ability of each of those multiple wireless terminal devices to handle signalling such as the indication transmitted in step 506, and to utilize pre-configured resources to monitor the shared channel directly. If at least one of the multiple wireless terminal devices is unable to receive or decode an indication as transmitted in step 506, or is unable to omit the step of monitoring the control channel, each of the multiple wireless terminal devices that is able to decode the indication may be configured to follow the implementation set out in FIG. 3a; that is, the indications transmitted to the multiple wireless terminal devices may comprise a configuration that the wireless terminal devices are to monitor and/or decode the control channel to obtain an indication of radio resources for a shared channel. Any wireless terminal devices which are unable to decode the indication transmitted in step 506 may instead monitor the control channel at the defined instance for an indication of radio resources for the shared channel (i.e. without decoding the indication). Conversely, if each of the multiple wireless terminal is able to receive or decode an indication as transmitted in step 506, or is able to omit the step of monitoring the control channel, each of the multiple wireless terminal devices may be configured to follow the implementation set out in FIG. 3b; that is, the indications transmitted to the multiple wireless terminal devices may comprise a configuration that the wireless terminal devices are to monitor the shared channel directly using pre-configured radio resources.

The ability of the wireless terminal device to handle such indications and/or to monitor the shared channel directly using pre-configured resources may be signalled by the wireless terminal device to the network during an ATTACH procedure. The ability of the wireless terminal device to handle such indications and/or to monitor the shared channel directly using pre-configured resources may be signalled to the network node, for example, in the paging message transmitted to the network node by an entity such as the MME 116.

The radio resources pre-configured in step 500 may comprise a timing offset between the timing of the indication transmitted in step 506, and the timing of a subsequent transmission on the shared channel. Alternatively, the timing offset may define the start of a search space (i.e. a range of time slots) in which the subsequent transmission on the shared channel is to take place. Thus, in those embodiments, the wireless terminal device searches for relevant transmissions within the search space.

The radio resources pre-configured in step 500 may additionally or alternatively comprise a number of repetitions of the transmission on the shared channel. In some embodiments, the maximum number of repetitions of the transmission on the shared channel is indicated in the pre-configured resources, while the actual number of repetitions may be smaller.

The radio resources pre-configured in step 500 may additionally or alternatively comprise a transport block size (TBS) with which the messages are to be transmitted on the shared channel. For example, the network node may select a most commonly used TBS. Alternatively the network node may pre-configure a plurality of different TBS values (e.g. a subset of the possible values), such that the wireless terminal device must search the shared channel using each of the pre-configured TBS values to determine the correct TBS value. In this way, however, the effort required to search can be reduced by limiting the TBS values to the subset of all possible values.

In further embodiments, the indication transmitted in step 506 may comprise an indication of one or more transmission parameters for the subsequent transmission on the shared channel (i.e. using the pre-configured resources). For example, the network node may pre-configure the wireless terminal device (e.g. in step 500) with a plurality of different TBS values; the particular chosen TBS value may then be communicated to the wireless terminal device, for example, in the indication transmitted in step 506 (e.g. through an index value associated with one of the plurality of pre-configured TBS values). In another example, the indication transmitted in step 506 may comprise an indication of the number of repetitions of the transmission on the shared channel. Alternatively, one or both of these parameters may be signalled in the pre-configured resources in step 500.

Two or more parameters may be combined into groups of different values, with the indication transmitted in step 506 (or the pre-configured radio resources transmitted in step 500) comprising an indication of a particular group of values for those two or more parameters. For example, the wireless terminal device may be configured in step 500 with a plurality of combinations of values for two or more parameters (e.g. TBS and number of repetitions). The indication transmitted in step 506 may comprise an indication of a particular combination of values for those parameters, e.g. via transmission of an index value associated with the particular combination of values.

In some embodiments, values for one or more parameters for a subsequent transmission on the shared channel may be signalled implicitly to the wireless terminal device based on the length of the indication (i.e. the length of the WUS, GSS, compact DCI, etc) transmitted in step 506. That is, where the indication is sequence based, the length of the sequence (e.g. the number of symbols) may be related to values for one or more parameters for a subsequent transmission on the shared channel; where the indication is symbol based, the number of repetitions of that symbol may similarly be related to values for one or more parameters for a subsequent transmission on the shared channel. For example, the value(s) for the parameter(s) may be proportional to the length of the indication, or otherwise the length of the indication may be linked to pre-defined values for the one or more parameters.

For example, the number of repetitions (or the maximum number of repetitions) of a subsequent transmission on the shared channel may be indicated by the length of the indication transmitted in step 506. The TBS may be indicated by the length of the indication transmitted in step 506. The length of the subsequent transmission on the shared channel may be indicated by the length of the indication transmitted in step 506.

Where the wireless terminal device is configured to follow the implementation of FIG. 3a (i.e. monitoring the control channel), the length of the indication transmitted in step 506 may be related to the number of repetitions (or the maximum number of repetitions) of a transmission on the control channel (e.g. a DCI).

Alternatively, the length of the indication transmitted in step 506 may be linked to the coverage of the wireless terminal device. That is, where the wireless terminal device is in relatively poor coverage, the indication may be longer to increase the likelihood that the wireless terminal device will be able to receive and decode the indication (e.g. through combining multiple repetitions).

Figure 6:
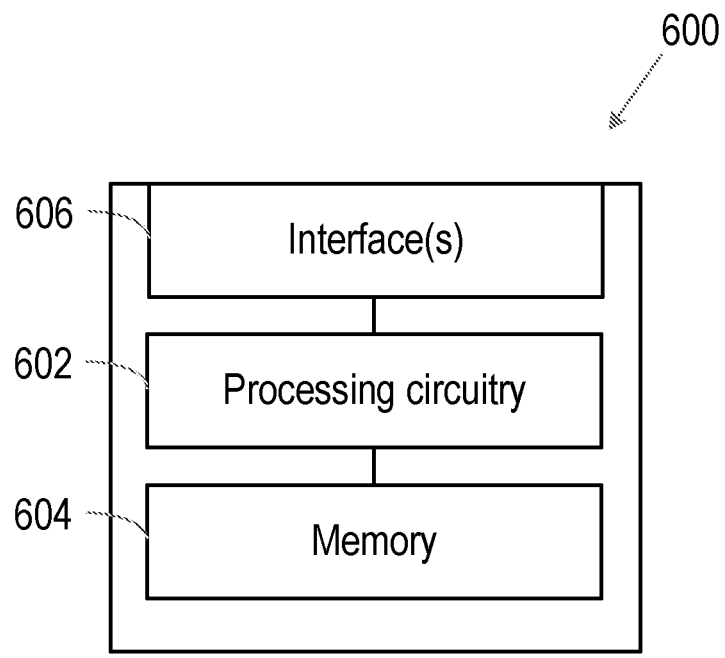
FIG. 6 is a schematic illustration of a wireless terminal device according to embodiments of the disclosure.

FIG. 6 is a schematic diagram of a terminal device 600 according to embodiments of the disclosure. For example, the terminal device 600 may correspond to the terminal device 114 described above. The terminal device 600 may be suitable for performing the method described above with respect to FIG. 4.

The terminal device 600 is operable in a mode in which the wireless terminal device is configurable to wake at defined instances to monitor a control channel for control messages from the wireless communications network, the control messages indicating radio resources for a shared channel over which one or more further messages are to be transmitted. The terminal device 600 comprises processing circuitry 602 and a non-transitory machine-readable medium 604 storing instructions which, when executed by the processing circuitry 602, cause the wireless terminal device to: while operating in the mode, monitor for receipt of an indication from a network node operable in the wireless communications network in a time window associated with a particular defined instance, the indication indicating that data is available at the wireless communications network for transmission to the wireless terminal device; and, responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

The terminal device 600 may further comprise one or more interfaces 606, providing interfaces for the transmission and/or reception of signals via any suitable modality. For example, the interfaces 606 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 602, machine-readable medium 604 and interfaces 606 may be coupled to each other in any suitable manner. For example, although FIG. 6 shows the components coupled together in series, it will be understood by those skilled in the art that the components may be coupled together in an alternative manner, such as via a bus.

Figure 7:
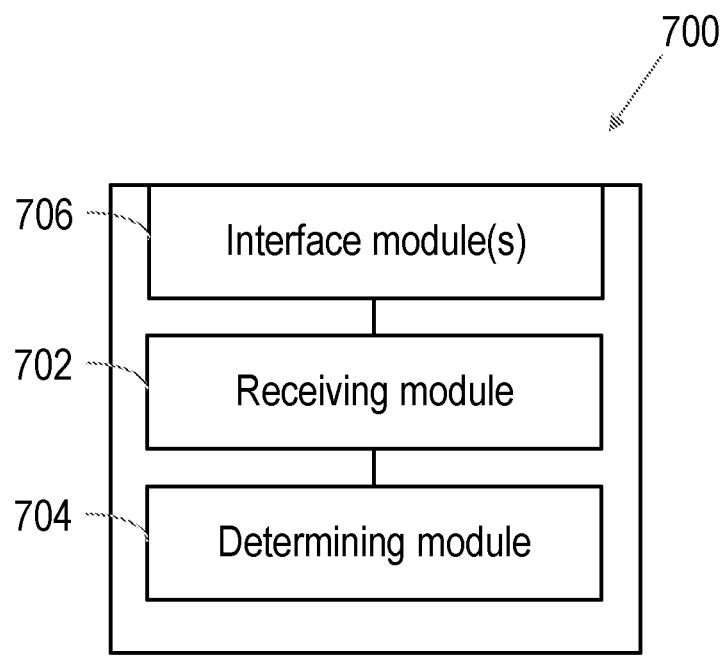
FIG. 7 is a schematic illustration of a wireless terminal device according to embodiments of the disclosure.

FIG. 7 is a schematic diagram of a terminal device 700 according to further embodiments of the disclosure. For example, the terminal device 700 may correspond to the terminal device 114 described above. The terminal device 700 may be suitable for performing the method described above with respect to FIG. 4.

The terminal device 700 is operable in a mode in which the wireless terminal device is configurable to wake at defined instances to monitor a control channel for control messages from the wireless communications network, the control messages indicating radio resources for a shared channel over which one or more further messages are to be transmitted. The terminal device comprises a receiving or monitoring module 702 and a determining module 704. The receiving or monitoring module 702 is configured to, while the terminal device 700 is operating in the mode, monitor for receipt of an indication from a network node operable in the wireless communications network in a time window associated with a particular defined instance, the indication indicating that data is available at the wireless communications network for transmission to the wireless terminal device. The determining module 704 is configured to, responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

The terminal device 700 may further comprise an interface module 706, providing one or more interfaces for the transmission and/or reception of signals via any suitable modality. For example, the interface module 706 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The receiving module 702, determining module 704 and interface module 706 may be coupled to each other in any suitable manner. For example, although FIG. 7 shows the components coupled together in series, it will be understood by those skilled in the art that the components may be coupled together in an alternative manner, such as via a bus.

Figure 8:
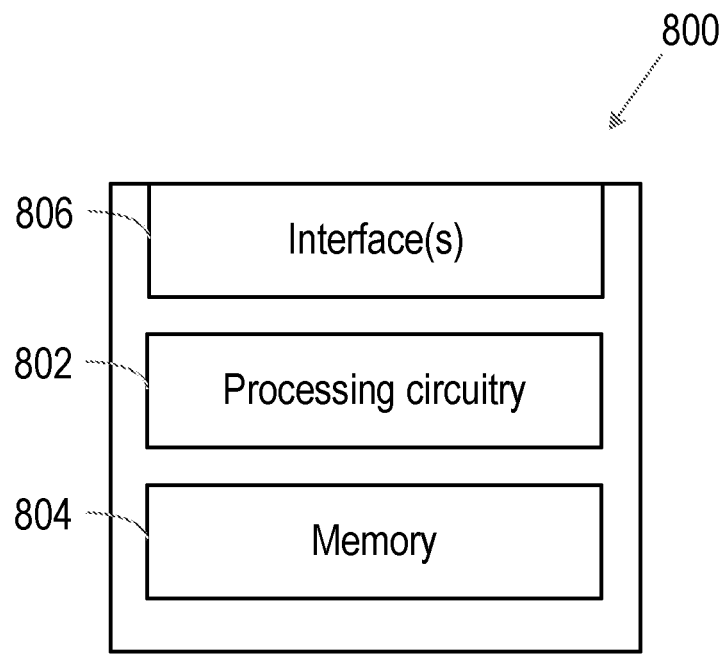
FIG. 8 is a schematic illustration of a wireless terminal device according to embodiments of the disclosure.

FIG. 8 is a schematic diagram of a network node 800 according to embodiments of the disclosure. For example, the network node 800 may be a radio access network node, such as the network node 112 as described above. Alternatively, the network node may be communicatively coupled to such a radio access network node. The node 800 may be suitable for performing the method described above with respect to FIG. 5.

The network node 800 is operable in a wireless communications network. A wireless terminal device operable in the wireless communications network is operable in a mode in which the wireless terminal device is configurable to wake at defined instances to monitor a control channel for control messages from the wireless communications network, the control messages indicating radio resources for a shared channel over which one or more further messages are to be transmitted. The node 800 comprises processing circuitry 802 and a non-transitory machine-readable medium 804 storing instructions which, when executed by the processing circuitry, cause the network node 800 to: responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device. The network node further configures the wireless terminal device to perform, responsive to receipt of an indication, one of: monitoring the control channel during the particular defined instance for a control message indicating radio resources for the shared channel; and monitoring the shared channel for one or more further messages using pre-configured radio resources.

The node 800 may further comprise one or more interfaces 806, providing interfaces for the transmission and/or reception of signals via any suitable modality. For example, the interfaces 806 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 802, machine-readable medium 804 and interfaces 806 may be coupled to each other in any suitable manner. For example, although FIG. 8 shows the components coupled together in series, it will be understood by those skilled in the art that the components may be coupled together in an alternative manner, such as via a bus.

Figure 9:
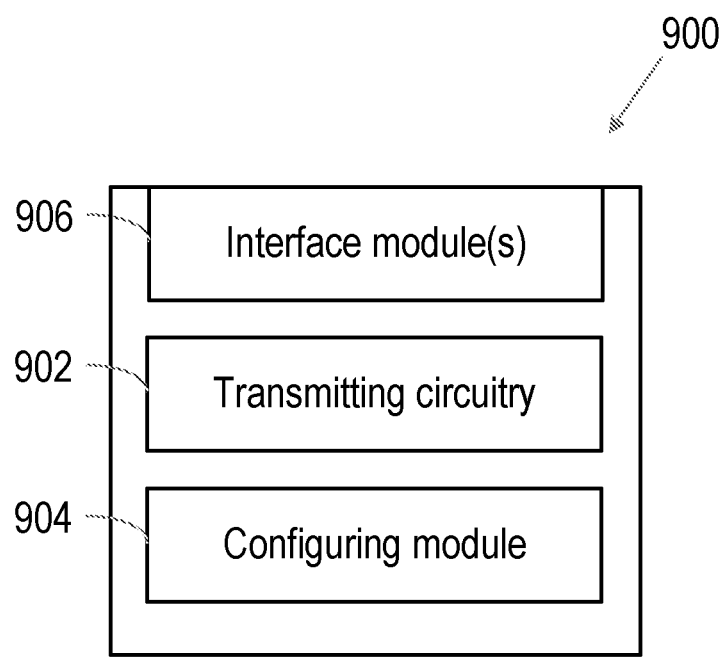
FIG. 9 is a schematic illustration of a wireless terminal device according to embodiments of the disclosure.

FIG. 9 is a schematic diagram of a network node 900 according to embodiments of the disclosure. For example, the network node 900 may be a radio access network node, such as the network node 112 as described above. Alternatively, the network node may be communicatively coupled to such a radio access network node. The node 900 may be suitable for performing the method described above with respect to FIG. 5.

The network node 900 is operable in a wireless communications network. A wireless terminal device operable in the wireless communications network is operable in a mode in which the wireless terminal device is configurable to wake at defined instances to monitor a control channel for control messages from the wireless communications network, the control messages indicating radio resources for a shared channel over which one or more further messages are to be transmitted.

The network node 900 comprises a transmitting module 902 and a configuring module 904. The transmitting module 902 is configured to, responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device. The configuring module 904 is configured to configure the wireless terminal device to perform, responsive to receipt of an indication, one of: monitoring the control channel during the particular defined instance for a control message indicating radio resources for the shared channel; and monitoring the shared channel for one or more further messages using pre-configured radio resources.

The node 900 may further comprise an interface module 906, providing one or more interfaces for the transmission and/or reception of signals via any suitable modality. For example, the interface module 906 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The transmitting module 902, configuring module 904 and interface module 906 may be coupled to each other in any suitable manner. For example, although FIG. 9 shows the components coupled together in series, it will be understood by those skilled in the art that the components may be coupled together in an alternative manner, such as via a bus.

Thus as described above, embodiments of the disclosure provide methods, apparatus and computer-readable media to receive signals transmitted over a shared channel while in a low power mode, such as a DRX mode.

It will be understood that the detailed examples outlined above are merely examples. According to embodiments of the disclosure, the steps may be presented in a different order to that described herein. Furthermore, additional steps may be incorporated in the method that are not explicitly recited above.

Various embodiments of the disclosure are set out in the following statements:

1. A method in a wireless terminal device for a wireless communications network, the wireless terminal device being operable in a mode in which the wireless terminal device is configurable to wake at defined instances to monitor a control channel for control messages from the wireless communications network, the control messages indicating radio resources for a shared channel over which one or more further messages are to be transmitted, the method comprising:

while operating in the mode, monitoring for receipt of an indication from a network node operable in the wireless communications network in a time window associated with a particular defined instance, the indication indicating that data is available at the wireless communications network for transmission to the wireless terminal device; and responsive to receipt of the indication, and based on a configuration received from the network node, determining whether to monitor the control channel during the particular defined instance for a control message indicating radio resources for the shared channel, or to monitor the shared channel for one or more further messages using pre-configured radio resources.

2. The method according to statement 1, wherein the indication comprises a signal transmitted by the network node and received by the wireless terminal device in the time window.

3. The method according to statement 2, wherein the signal comprises a wake-up signal.

4. The method according to statement 1, wherein the indication comprises an absence of a signal transmitted by the network node and received by the wireless terminal device in the time window.

5. The method according to statement 4, wherein the signal comprises a go-to-sleep signal.

6. The method according to any one of the preceding statements, wherein the indication comprises a sequence of symbols.

7. The method according to any one of the preceding statements, wherein the indication comprises a single bit.

8. The method according to statement 1 or 2, wherein the indication comprises a compact downlink control information, DCI.

9. The method according to statement 8, wherein the compact DCI comprises fewer bits than a paging DCI defined according to version 13.6.0 or 14.3.0 of the 3GPP TS 36.212.

10. The method according to any one of the preceding statements, wherein the indication comprises an indication of a transport block size for a further message transmitted or received using the shared channel.

11. The method according to any one of the preceding statements, wherein the indication comprises an indication of a number of repetitions for a further message transmitted or received using the shared channel.

12. The method according to any one of the preceding statements, wherein the time period begins prior to the particular defined instance.

13. The method according to statement 12, wherein the time period begins a configured time before the particular defined instance.

14. The method according to any one of the preceding statements, wherein the time period immediately precedes the particular defined instance.

15. The method according to any one of the preceding statements, wherein the defined instances comprise paging occasions, and the further messages comprise paging messages.

16. The method according to any one of statements 1 to 14, wherein the defined instances comprise periods of active time for the wireless terminal device, and the further messages comprise user data.

17. The method according to any one of the preceding statements, wherein the mode is a discontinuous reception, DRX, mode.

18. The method according to any one of the preceding statements, wherein the configuration is received in system information transmitted by the network node.

19. The method according to any one of statements 1 to 17, wherein the configuration is comprised within the indication received in the time period.

20. The method according to statement 19, wherein the configuration comprises a dedicated scrambling code applied to the indication.

21. The method according to any one of the preceding statements, further comprising receiving an indication of the pre-configured radio resources via signalling from the network node.

22. The method according to any one of the preceding statements, wherein the pre-configured radio resources comprise a timing offset relative to a time of receipt of the indication.

23. A method in a network node operable in a wireless communications network, a wireless terminal device operable in the wireless communications network being operable in a mode in which the wireless terminal device is configurable to wake at defined instances to monitor a control channel for control messages from the wireless communications network, the control messages indicating radio resources for a shared channel over which one or more further messages are to be transmitted, the method comprising:
    responsive to a determination that data is available at the wireless communications network for transmission to the wireless terminal device, transmitting an indication to the wireless terminal device in a time window associated with a particular defined instance, the indication indicating that data is available at the wireless communications network for transmission to the wireless terminal device,
    wherein the network node further configures the wireless terminal device to perform, responsive to receipt of an indication, one of:
        monitoring the control channel during the particular defined instance for a control message indicating radio resources for the shared channel; and
        monitoring the shared channel for one or more further messages using pre-configured radio resources.

24. The method according to statement 23, wherein the indication comprises a signal transmitted by the network node and received by the wireless terminal device in the time window.

25. The method according to statement 24, wherein the signal comprises a wake-up signal.

26. The method according to statement 23, wherein the indication comprises an absence of a signal transmitted by the network node and received by the wireless terminal device in the time window.

27. The method according to statement 26, wherein the signal comprises a go-to-sleep signal.

28. The method according to any one of statements 23 to 27, wherein the indication comprises a sequence of symbols.

29. The method according to any one of statements 23 to 28, wherein the indication comprises a single bit.

30. The method according to statement 23 or 24, wherein the signal comprises a compact downlink control information, DCI.

31. The method according to statement 30, wherein the compact DCI comprises fewer bits than a paging DCI defined according to version 13.6.0 or 14.3.0 of the 3GPP TS 36.212.

32. The method according to any one of statements 23 to 31, wherein the indication comprises an indication of a transport block size for a further message transmitted or received using the shared channel.

33. The method according to any one of statements 23 to 32, wherein the indication comprises an indication of a number of repetitions for a further message transmitted or received using the shared channel.

34. The method according to any one of statements 23 to 33, wherein the time period begins prior to the particular defined instance.

35. The method according to statement 34, wherein the time period begins a configured time before the particular defined instance.

36. The method according to any one of statements 23 to 35, wherein the time period immediately precedes the particular defined instance.

37. The method according to any one of statements 23 to 36, wherein the defined instances comprise paging occasions, and the further messages comprise paging messages.

38. The method according to any one of statements 23 to 36, wherein the defined instances comprise periods of active time for the wireless terminal device, and the further messages comprise user data.

39. The method according to any one of statements 23 to 38, wherein the mode is a discontinuous reception, DRX, mode.

40. The method according to any one of statements 23 to 39, wherein the network node configures the wireless terminal device via system information or dedicated signalling transmitted by the network node.

41. The method according to any one of statements 23 to 39, wherein the network node configures the wireless terminal device via the indication transmitted in the time period.

42. The method according to statement 41, wherein the network node configures the wireless terminal device by scrambling the indication with a dedicated scrambling code.

43. The method according to any one of statements 23 to 42, further comprising transmitting an indication of the pre-configured radio resources via signalling from the network node.

44. The method according to any one of statements 23 to 43, wherein the pre-configured radio resources comprise a timing offset relative to a time of receipt of the indication.

45. The method according to any one of statements 23 to 44, further comprising:
- determining that data is available at the wireless communications network for transmission to a plurality of wireless terminal devices wherein the wireless terminal device is one of the plurality of wireless terminal devices;
- determining that at least one of the plurality of wireless terminal devices does not support monitoring the shared channel for one or more further messages using pre-configured radio resources; and
- configuring the wireless terminal device to monitor the control channel during the particular defined instance for a control message indicating radio resources for the shared channel.

46. A wireless terminal device for a wireless communications network, the wireless terminal device being configured to perform the method according to any one of statements 1 to 22.

47. A network node for a wireless communications network, the network node being configured to perform the method according to any one of statements 23 to 45.

48. A wireless terminal device for a wireless communications network, the wireless terminal device being operable in a mode in which the wireless terminal device is configurable to wake at defined instances to monitor a control channel for control messages from the wireless communications network, the control messages indicating radio resources for a shared channel over which one or more further messages are to be transmitted, the wireless terminal device comprising processing circuitry and a non-transitory machine-readable medium storing instructions which, when executed by the processing circuitry, cause the wireless terminal device to:
- while operating in the mode, monitor for receipt of an indication from a network node operable in the wireless communications network in a time window associated with a particular defined instance, the indication indicating that data is available at the wireless communications network for transmission to the wireless terminal device; and
- responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

49. The wireless terminal device according to statement 48, wherein the indication comprises a signal transmitted by the network node and received by the wireless terminal device in the time window.

50. The wireless terminal device according to statement 49, wherein the signal comprises a wake-up signal.

51. The wireless terminal device according to statement 48, wherein the indication comprises an absence of a signal transmitted by the network node and received by the wireless terminal device in the time window.

52. The wireless terminal device according to statement 51, wherein the signal comprises a go-to-sleep signal.

53. The wireless terminal device according to any one of statements 48 to 52, wherein the indication comprises a sequence of symbols.

54. The wireless terminal device according to any one of statements 48 to 53, wherein the indication comprises a single bit.

55. The wireless terminal device according to statement 48 or 49, wherein the indication comprises a compact downlink control information, DCI.

56. The wireless terminal device according to statement 55, wherein the compact DCI comprises fewer bits than a paging DCI defined according to version 13.6.0 or 14.3.0 of the 3GPP TS 36.212.

57. The wireless terminal device according to any one of statements 48 to 56, wherein the indication comprises an indication of a transport block size for a further message transmitted or received using the shared channel.

58. The wireless terminal device according to any one of statements 48 to 57, wherein the indication comprises an indication of a number of repetitions for a further message transmitted or received using the shared channel.

59. The wireless terminal device according to any one of statements 48 to 58, wherein the time period begins prior to the particular defined instance.

60. The wireless terminal device according to statement 59, wherein the time period begins a configured time before the particular defined instance.

61. The wireless terminal device according to any one of statements 48 to 60, wherein the time period immediately precedes the particular defined instance.

62. The wireless terminal device according to any one of statements 48 to 61, wherein the defined instances comprise paging occasions, and the further messages comprise paging messages.

63. The wireless terminal device according to any one of statements 48 to 61, wherein the defined instances comprise periods of active time for the wireless terminal device, and the further messages comprise user data.

64. The wireless terminal device according to any one of statements 48 to 63, wherein the mode is a discontinuous reception, DRX, mode.

65. The wireless terminal device according to any one of statements 48 to 64, wherein the configuration is received in system information transmitted by the network node.

66. The wireless terminal device according to any one of statements 48 to 64, wherein the configuration is comprised within the indication received in the time period.

67. The wireless terminal device according to statement 66, wherein the configuration comprises a dedicated scrambling code applied to the indication.

68. The wireless terminal device according to any one of statements 48 to 67, further comprising receiving an indication of the pre-configured radio resources via signalling from the network node.

69. The wireless terminal device according to any one of statements 48 to 68, wherein the pre-configured radio resources comprise a timing offset relative to a time of receipt of the indication.

70. A network node operable in a wireless communications network, a wireless terminal device operable in the wireless communications network being operable in a mode in which the wireless terminal device is configurable to wake at defined instances to monitor a control channel for control messages from the wireless communications network, the control messages indicating radio resources for a shared channel over which one or more further messages are to be transmitted, the network node comprising processing circuitry and a non-transitory machine-readable medium storing instructions which, when executed by the processing circuitry, cause the network node to:
- responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device,
wherein the network node further configures the wireless terminal device to perform, responsive to receipt of an indication, one of:
monitoring the control channel during the particular defined instance for a control message indicating radio resources for the shared channel; and
monitoring the shared channel for one or more further messages using pre-configured radio resources.

71. The network node according to statement 70, wherein the indication comprises a signal transmitted by the network node and received by the wireless terminal device in the time window.

72. The network node according to statement 71, wherein the signal comprises a wake-up signal.

73. The network node according to statement 70, wherein the indication comprises an absence of a signal transmitted by the network node and received by the wireless terminal device in the time window.

74. The network node according to statement 73, wherein the signal comprises a go-to-sleep signal.

75. The network node according to any one of statements 70 to 74, wherein the indication comprises a sequence of symbols.

76. The network node according to any one of statements 70 to 75, wherein the indication comprises a single bit.

77. The network node according to statement 70 or 71, wherein the signal comprises a compact downlink control information, DCI.

78. The network node according to statement 77, wherein the compact DCI comprises fewer bits than a paging DCI defined according to version 13.6.0 or 14.3.0 of the 3GPP TS 36.212.

79. The network node according to any one of statements 70 to 78, wherein the indication comprises an indication of a transport block size for a further message transmitted or received using the shared channel.

80. The network node according to any one of statements 70 to 79, wherein the indication comprises an indication of a number of repetitions for a further message transmitted or received using the shared channel.

81. The network node according to any one of statements 70 to 80, wherein the time period begins prior to the particular defined instance.

82. The network node according to statement 81, wherein the time period begins a configured time before the particular defined instance.

83. The network node according to any one of statements 70 to 82, wherein the time period immediately precedes the particular defined instance.

84. The network node according to any one of statements 70 to 83, wherein the defined instances comprise paging occasions, and the further messages comprise paging messages.

85. The network node according to any one of statements 70 to 83, wherein the defined instances comprise periods of active time for the wireless terminal device, and the further messages comprise user data.

86. The network node according to any one of statements 70 to 85, wherein the mode is a discontinuous reception, DRX, mode.

87. The network node according to any one of statements 70 to 86, wherein the network node configures the wireless terminal device via system information or dedicated signalling transmitted by the network node.

88. The network node according to any one of statements 70 to 86, wherein the network node configures the wireless terminal device via the indication transmitted in the time period.

89. The network node according to statement 88, wherein the network node configures the wireless terminal device by scrambling the indication with a dedicated scrambling code.

90. The network node according to any one of statements 70 to 89, further comprising transmitting an indication of the pre-configured radio resources via signalling from the network node.

91. The network node according to any one of statements 70 to 90, wherein the pre-configured radio resources comprise a timing offset relative to a time of receipt of the indication.

92. The network node according to any one of statements 70 to 91, wherein the non-transitory machine-readable medium further stores instructions which, when executed by the processing circuitry, cause the network node to:
determine that data is available at the wireless communications network for transmission to a plurality of wireless terminal devices wherein the wireless terminal device is one of the plurality of wireless terminal devices;
determine that at least one of the plurality of wireless terminal devices does not support monitoring the shared channel for one or more further messages using pre-configured radio resources; and
configure the wireless terminal device to monitor the control channel during the particular defined instance for a control message indicating radio resources for the shared channel.

93. A wireless terminal device for a wireless communications network, the wireless terminal device being operable in a mode in which the wireless terminal device is configurable to wake at defined instances to monitor a control channel for control messages from the wireless communications network, the control messages indicating radio resources for a shared channel over which one or more further messages are to be transmitted, the wireless terminal device comprising:
a monitoring module configured to, while operating in the mode, monitor for receipt of an indication from a network node operable in the wireless communications network in a time window associated with a particular defined instance, the indication indicating that data is available at the wireless communications network for transmission to the wireless terminal device; and
a determining module configured to, responsive to receipt of the indication, and based on a configuration received from the network node, determine whether to monitor the control channel during the particular defined instance for a control message indicating radio resources for the shared channel, or to monitor the shared channel for one or more further messages using pre-configured radio resources.

93. A network node operable in a wireless communications network, a wireless terminal device operable in the wireless communications network being operable in a mode in which the wireless terminal device is configurable to wake at defined instances to monitor a control channel for control messages from the wireless communications network, the control messages indicating radio resources for a shared channel over which one or more further messages are to be transmitted, the network node comprising:
a transmission module configured to, responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device, wherein the network node further configures the wireless terminal device to perform, responsive to receipt of an indication, one of:

monitoring the control channel during the particular defined instance for a control message indicating radio resources for the shared channel; and monitoring the shared channel for one or more further messages using pre-configured radio resources.

The invention claimed is:

1. A method in a wireless terminal device for a wireless communications network, the wireless terminal device being operable in a mode in which the wireless terminal device is configurable to wake at defined instances to monitor a control channel for control messages from the wireless communications network, the control messages indicating radio resources for a shared channel over which one or more further messages are to be transmitted, the method comprising:

while operating in the mode, monitoring for receipt of an indication from a network node operable in the wireless communications network in a time window associated with a particular defined instance, the indication indicating that data is available at the wireless communications network for transmission to the wireless terminal device; and responsive to receipt of the indication, and based on a configuration received from the network node, determining whether to monitor the control channel during the particular defined instance for a control message indicating radio resources for the shared channel, or to monitor the shared channel for one or more further messages using pre-configured radio resources, wherein the configuration is included within the indication received in the time window.

2. The method according to claim 1, wherein the indication comprises a signal transmitted by the network node and received by the wireless terminal device in the time window.

3. The method according to claim 2, wherein the signal comprises a wake-up signal.

4. The method according to claim 1, wherein the indication comprises an absence of a signal transmitted by the network node, and the signal comprises a go-to-sleep signal.

5. The method according to claim 1, wherein:

the defined instances comprise paging occasions, and the further messages comprise paging messages; or the defined instances comprise periods of active time for the wireless terminal device, and the further messages comprise user data.

6. The method according to claim 1, wherein the configuration is received in system information transmitted by the network node;

the configuration is received from the network node via dedicated signalling; or the configuration is comprised within the indication received in the time period.

7. The method according to claim 1, wherein the configuration comprises one or more of the following:

an indication of a number of repetitions for a further message transmitted or received using the shared channel; and an indication of a transport block size for a further message transmitted or received using the shared channel.

8. A method in a network node operable in a wireless communications network, a wireless terminal device operable in the wireless communications network being operable in a mode in which the wireless terminal device is configurable to wake at defined instances to monitor a control channel for control messages from the wireless communications network, the control messages indicating radio resources for a shared channel over which one or more further messages are to be transmitted, the method comprising:

responsive to a determination that data is available at the wireless communications network for transmission to the wireless terminal device, transmitting an indication to the wireless terminal device in a time window associated with a particular defined instance, the indication indicating that data is available at the wireless communications network for transmission to the wireless terminal device, wherein the network node further configures the wireless terminal device to perform, responsive to receipt of an indication, one of:

monitoring the control channel during the particular defined instance for a control message indicating radio resources for the shared channel; and monitoring the shared channel for one or more further messages using pre-configured radio resources, wherein the network node configures the wireless terminal device via the indication transmitted in the time window.

9. The method according to claim 8, wherein the indication comprises a signal transmitted by the network node.

10. The method according to claim 9, wherein the signal comprises a wake-up signal.

11. The method according to claim 8, wherein the indication comprises an absence of a signal transmitted by the network node and received by the wireless terminal device in the time window, and the signal comprises a go-to-sleep signal.

12. The method according to claim 8, wherein:

the defined instances comprise paging occasions, and the further messages comprise paging messages; or the defined instances comprise periods of active time for the wireless terminal device, and the further messages comprise user data.

13. The method according to claim 8, wherein the network node configures the wireless terminal device via system information or dedicated signalling transmitted by the network node; or the network node configures the wireless terminal device via the indication transmitted in the time period.

14. The method according to claim 8, wherein the configuration comprises one or more of the following:

an indication of a number of repetitions for a further message transmitted or received using the shared channel; and an indication of a transport block size for a further message transmitted or received using the shared channel.

15. A network node operable in a wireless communications network, a wireless terminal device operable in the wireless communications network being operable in a mode in which the wireless terminal device is configurable to wake at defined instances to monitor a control channel for control messages from the wireless communications network, the control messages indicating radio resources for a shared channel over which one or more further messages are to be transmitted, the network node comprising processing circuitry and a non-transitory machine-readable medium storing instructions which, when executed by the processing circuitry, cause the network node to:
  responsive to a determination that data is available at the wireless communications network for transmission to the wireless terminal device, transmit an indication to the wireless terminal device in a time window associated with a particular defined instance, the indication indicating that data is available at the wireless communications network for transmission to the wireless terminal device,
  wherein the network node further configures the wireless terminal device to perform, responsive to receipt of an indication, one of:
  monitoring the control channel during the particular defined instance for a control message indicating radio resources for the shared channel; and
  monitoring the shared channel for one or more further messages using pre-configured radio resources,
  wherein the network node configures the wireless terminal device via the indication transmitted in the time window.

16. The network node according to claim 15, wherein the indication comprises a signal transmitted by the network node.

17. The network node according to claim 16, wherein the signal comprises a wake-up signal.

18. The network node according to claim 15, wherein the indication comprises an absence of a signal transmitted by the network node and received by the wireless terminal device in the time window, and the signal comprises a go-to-sleep signal.

19. The network node according to claim 15, wherein
  the defined instances comprise paging occasions, and the further messages comprise paging messages; or
  the defined instances comprise periods of active time for the wireless terminal device, and the further messages comprise user data.

20. The network node according to claim 15, wherein:
  the network node configures the wireless terminal device via system information or dedicated signalling transmitted by the network node; or
  the network node configures the wireless terminal device via the indication transmitted in the time period.

* * * * *